(12) United States Patent
Schot

(10) Patent No.: US 10,093,400 B2
(45) Date of Patent: Oct. 9, 2018

(54) SYSTEMS AND METHODS FOR HANDLING A MAN OVERBOARD SITUATION

(71) Applicant: PanPan B.V., Alkmaar (NL)

(72) Inventor: Sebastian Jason Schot, Alkmaar (NL)

(73) Assignee: PanPan B.V., Alkmaar (NL)

( * ) Notice: Subject to any disclaimer, the term of this patent is extended or adjusted under 35 U.S.C. 154(b) by 0 days.

(21) Appl. No.: 15/821,315

(22) Filed: Nov. 22, 2017

(65) Prior Publication Data
US 2018/0141627 A1 May 24, 2018

Related U.S. Application Data

(60) Provisional application No. 62/426,046, filed on Nov. 23, 2016.

(51) Int. Cl.
*G01S 1/00* (2006.01)
*B63C 9/00* (2006.01)

(52) U.S. Cl.
CPC .... *B63C 9/0005* (2013.01); *B63C 2009/0017* (2013.01)

(58) Field of Classification Search
None
See application file for complete search history.

(56) References Cited

U.S. PATENT DOCUMENTS

| | | |
|---|---|---|
| 7,176,832 B2 | 2/2007 | Bruno et al. |
| 2007/0082652 A1 | 4/2007 | Hartigan et al. |
| 2013/0171956 A1* | 7/2013 | Lever .................. G08B 21/088 455/404.1 |
| 2016/0267766 A1* | 9/2016 | Inchausti ............. G08B 21/086 |

OTHER PUBLICATIONS https://www.indiegogo.com/projects/iswimband-the-ultimate-drowning-detection-device#/.
https://play.google.com/store/apps/details?id=com.aquaticsafetyconceptsllc.iswimband&hl=en.
http://www.boatingbusiness.com/news101/industry-news/panpan-crew-watcher.
PanPan—a smartphone MOB beacon, Yachting World, Jul. 20, 2016.

* cited by examiner

*Primary Examiner* — Brent Swarthout
(74) *Attorney, Agent, or Firm* — The Roy Gross Law Firm, LLC; Roy Gross

(57) ABSTRACT

Methods and systems for detecting and locating a man overboard situation. In particular, the methods and systems detect a point of loss of a man overboard situation and allow for the ship to coordinate back to the point of loss.

30 Claims, 21 Drawing Sheets
(18 of 21 Drawing Sheet(s) Filed in Color)

SYSTEMS AND METHODS FOR HANDLING A MAN OVERBOARD SITUATION

CROSS REFERENCE TO RELATED APPLICATIONS

This application claims priority to U.S. Provisional Patent Application No. 62/426,046 entitled "PanPan crew watcher" filed Nov. 23, 2016. The content of this application is incorporated by referenced herein in its entirety.

FIELD OF THE INVENTION

The present invention generally relates to an audible man overboard alarm triggered by a loss of signal or water detection.

BACKGROUND OF THE INVENTION

"Man overboard!" is an exclamation given aboard a vessel to indicate that someone (not necessarily a "man" but historically one of the crewmen "manning" the vessel) has fallen off of the ship into the water and is in need of immediate rescue.

Current man overboard technology consists of three major types of beacons:
1. Automatic Identification System (AIS), an automatic tracking system used on ships and by vessel traffic services (VTS).
2. EPIRB (Emergency Position Indicator Radio Beacon, which are tracking transmitters which aid in the detection and location of boats, aircraft, and people in distress.
3. A PLB (personal locator beacon) is a particular type of EPIRB that is typically smaller, has a shorter battery life and unlike a proper EPIRB is registered to a person rather than a vessel.

AIS and PLB beacons are focused towards the individual whereas EPIRB beacons are dedicated to the vessel. While all three types share similarities, AIS beacons are focused on rescue by the mother ship and often automatically activated. Contrarily PLB and EPIRB beacons are manually activated and do not alarm the mother ship but rather the coast guard.

SUMMARY OF THE INVENTION

The subject matter disclosed in the present invention discloses a method and system for detecting and handling a man overboard event. The present invention enables a fast response time to a man overboard event. The methods and system disclosed herein provide intuitive rescue guidance for better chances of man overboard recovery and provide man overboard safety equipment at affordable cost, compared to AIS, PLB & EPRIB.

It is an object of the subject matter to disclose a method of communicating a man overboard situation, comprising periodically exchanging wireless signals between a communication beacon configured to be worn by a crew member of a vessel and a mobile electronic device located on the vessel, detecting a man overboard situation according to irregularities of the exchange of the wireless signals, determining a point of loss location upon detection of the man overboard event, generating an alarm signal indicating crew members of the vessel about the man overboard situation, and displaying the location of the point of loss location relative to the vessel on the mobile electronic device located on the vessel.

In some cases, at least one, if not more of, the method steps occur automatically and without input.

In some cases, the point of loss location is captured upon detection of the man overboard event. In some cases, the method further comprising detecting the man overboard situation by the communication beacon. In some cases, detecting the man overboard situation is detected via a water sensor integrated into the communication beacon. In some cases, at least one, if not more of, the method steps occur automatically and without input.

In some cases, the method further comprising detecting the man overboard situation by the mobile electronic device located on the vessel according to signal properties. In some cases, the method further comprises displaying the time elapsed since the man overboard situation was detected on the mobile electronic device located on the vessel.

In some cases, the method further comprises displaying a distance between a current location of the naval vessel and the point of loss location. In some cases, the displaying a distance between a current location of the naval vessel and the point of loss location is continuously updated in real time.

In some cases, the method further comprises pairing the communication beacon and the mobile electronic device located on the vessel. In some cases, pairing is done by placing the communication beacon close to the mobile electronic device located on the vessel and enabling exchange of wireless signals using Bluetooth communication. In some cases, the pairing is done by other technology such as NFC technology. In some embodiments, the system uses signal K and NMEA technology.

In some cases, the method further comprises generating an audible signal outputted automatically from the mobile electronic device located on the vessel upon detection of the man overboard situation. In some cases, the audible signal outputting automatically from the mobile electronic device overrides the volume settings on the mobile electronic device, such as when the mobile electronic device is on silent mode.

In some cases, the method further comprises activating a clock upon detection of loss of communication or when water is detected by the sensor between the communication beacon and the mobile electronic device located on the vessel and generating the alarm signal in response to the loss of communication or water detection being measured on a time longer than a predefined threshold as to prevent false alarms. In some cases, the predefined threshold is a few seconds or a few minutes.

In some cases, the method further comprises displaying the alarm on a foreground of the mobile electronic device located on the vessel upon detection of the man overboard situation.

In some cases, the method further comprises displaying textual instructions on the mobile electronic device upon detection of the man overboard situation. In some cases, the textual instructions are rescue instructions.

In some cases, the method further comprises displaying a compass on a display of the mobile electronic device; said compass shows the direction between the mobile electronic device to the point of loss.

In some cases, the method further comprises displaying a compass on a display of the mobile electronic device located on the vessel upon detection of the man overboard situation, said compass displays the direction and distance to the point of loss.

In some cases, the compass displays the rescue course. In some cases, the compass displays the magnetic north. In some instances, compass displays both the rescue course and the magnetic north simultaneously.

In some cases the display shows an estimated search radius upon arrival at the point of loss. The location of the vessel is visually shown within that search radius among with the track that has been covered within the search radius. The mobile electronic device indicates the crew on the vessel to zig-zag said search radius in an effort to locate the MOB.

In some cases, transmitting the alarm signal from the communication beacon to the mobile electronic device located on the vessel uses mesh technology, GPS, Bluetooth Technology, and/or Wi-Fi. In some cases, the step of periodically exchanging wireless signals occurs on a continuous basis and an irregularity in the exchange of the wireless signals triggers a man overboard event.

It is another object of the subject matter to disclose a system for handling a man overboard situation on a vessel, comprising a communication beacon comprising a wireless transceiver configured to send and receive wireless signals, a mobile electronic device configured to be located on the vessel, said device comprising a wireless transmitter configured to exchange the wireless signals with the communication beacon, wherein an irregularity in the exchange of wireless signals indicates a man overboard situation, wherein upon the occurrence of the man overboard situation, the mobile electronic device determines the point of loss location, the mobile electronic device generates an alarm signal indicating crew members of the vessel about the man overboard situation, and the mobile electronic device displays the location of the point of loss location relative to the vessel on the mobile electronic device.

In some cases, the system works automatically and without input. In some cases, the mobile electronic device includes software executing on a processor. In some cases, the mobile electronic device includes a software loaded on a memory or a processor, such that the processor or memory executes the software.

In some cases, the alarm signal comprises at least one of sound, visuals, strobe light and vibrations. In some cases, the alarm signal comprises a strobe on the beacon. In some cases, the beacon includes an alarm or sound generating element on the beacon.

In some cases, the system further comprises displaying at least one of location coordinates, heading/direction, magnetic north, time since event, distance to point of loss, estimated search radius size.

In some cases, the communication beacon further comprising a transmitter configured to transmit an alarm signal to a recipient electronic mobile device of other crew members, indicating the recipient crew members of the man overboard situation.

In some cases, the mobile electronic device further comprises displaying a compass on a display of the mobile electronic device; said compass shows the direction between the electronic mobile device located on the vessel to the point of loss.

In some cases, a recipient electronic mobile device comprising a wireless receiver configured to receive the alarm signal from the communication beacon and to display the location of the crew member relative to the vessel on the recipient electronic mobile device.

In some cases, the communication beacon includes a water sensor configured to detect when the communication beacon is in water and a wireless transmitter configured to transmit an alarm signal.

In some cases, the system further comprises the electronic mobile device located on the vessel scans for a homing signal emitted from the communication beacon.

In some cases, the system further comprises calculating a real-time location of the communication beacon according to the point of loss, location of the communication beacon according to the received homing signal, and the time elapsed since the man overboard event.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 shows a smartphone running a mobile application, according to exemplary embodiments of the disclosed subject matter;

FIG. 2 shows a communication beacon using Bluetooth technology, according to exemplary embodiments of the disclosed subject matter;

FIG. 3 shows screenshots of an installation and setup process of the beacon relative to a mobile electronic device located on the vessel, according to exemplary embodiments of the disclosed subject matter;

FIG. 4 shows a screenshot of a status feedback displayed on a mobile application running mobile electronic device located on the vessel, according to exemplary embodiments of the disclosed subject matter;

FIG. 5 shows a screenshot of a status feedback displayed on the mobile application with one beacon disabled, according to exemplary embodiments of the disclosed subject matter;

FIG. 6 shows a screenshot of a status feedback in which water is detected for a specific period of time, according to exemplary embodiments of the disclosed subject matter;

FIG. 7 shows a screenshot of a status feedback in which the beacon is identified as proximal to the mobile electronic device located on the vessel, according to exemplary embodiments of the disclosed subject matter;

FIG. 8 shows a screenshot of a status feedback in which the beacon is identified as loss of signal, according to exemplary embodiments of the disclosed subject matter;

FIG. 9 shows a screenshot of a status feedback in case there is an error concerning the beacon, according to exemplary embodiments of the disclosed subject matter;

FIG. 10 shows a screenshot of a status feedback in case there is a man overboard event, according to exemplary embodiments of the disclosed subject matter;

FIG. 11 shows a screenshot of a compass displayed on the mobile electronic device, according to exemplary embodiments of the invention;

Figure 12:
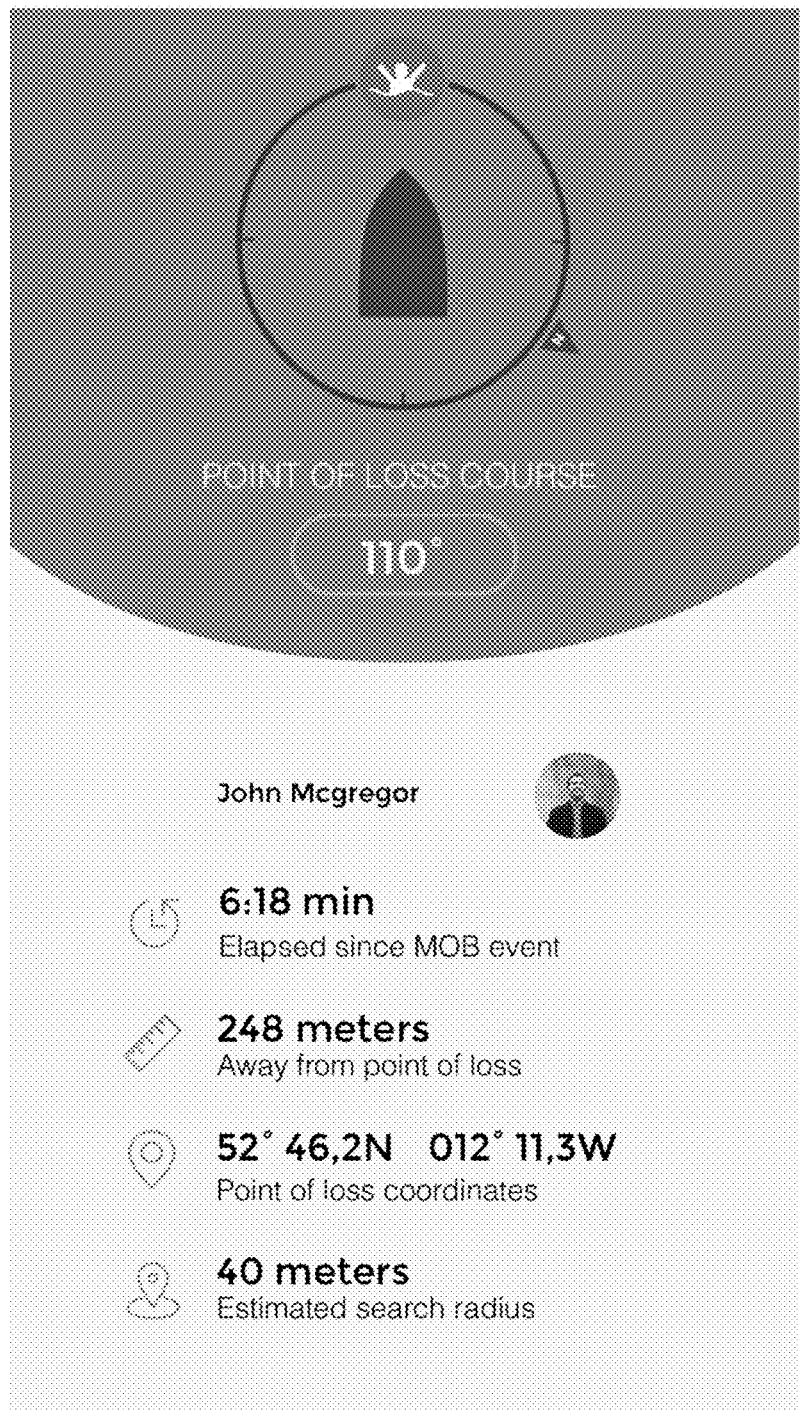
Figure 13:
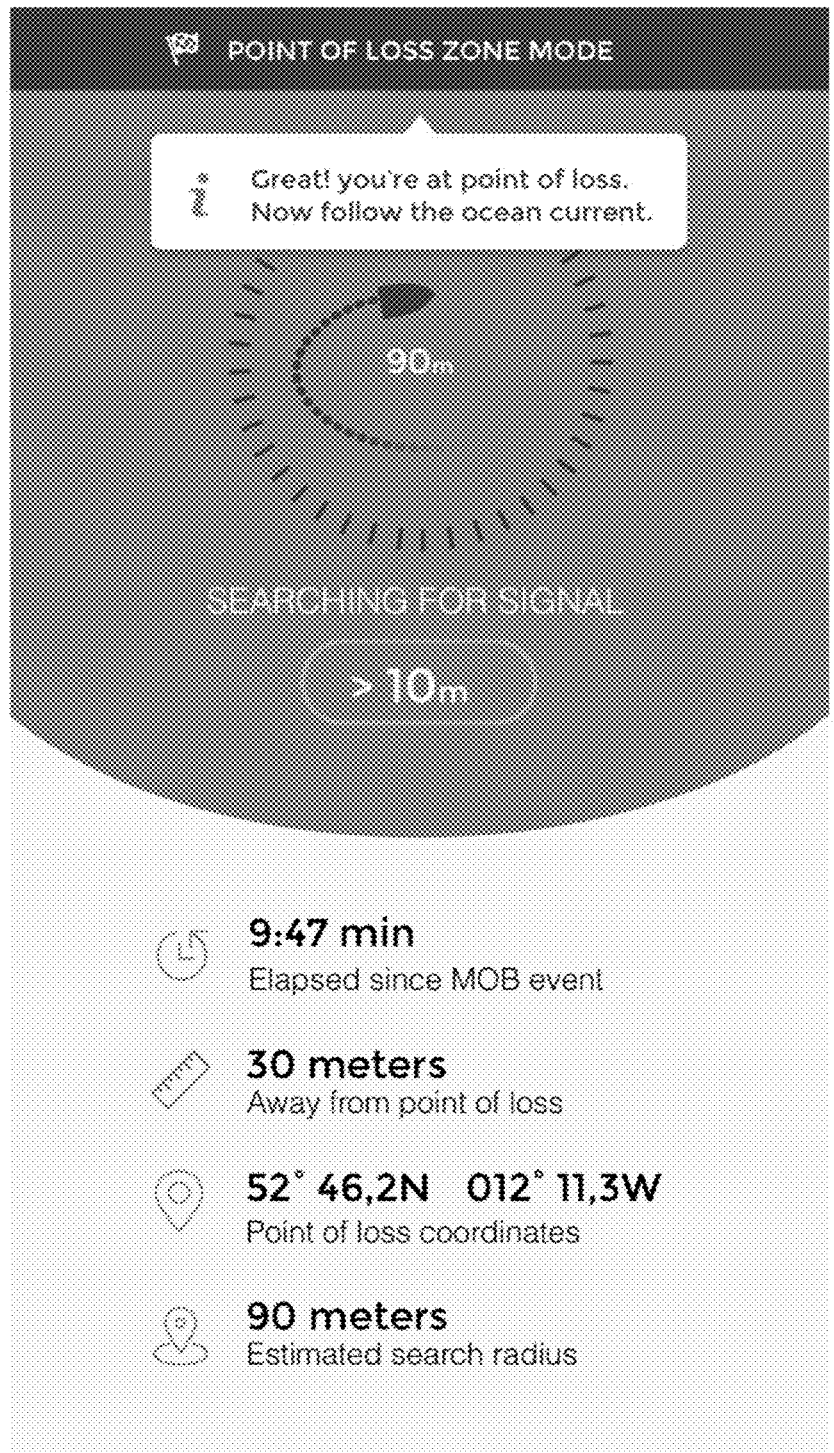
Figure 14:
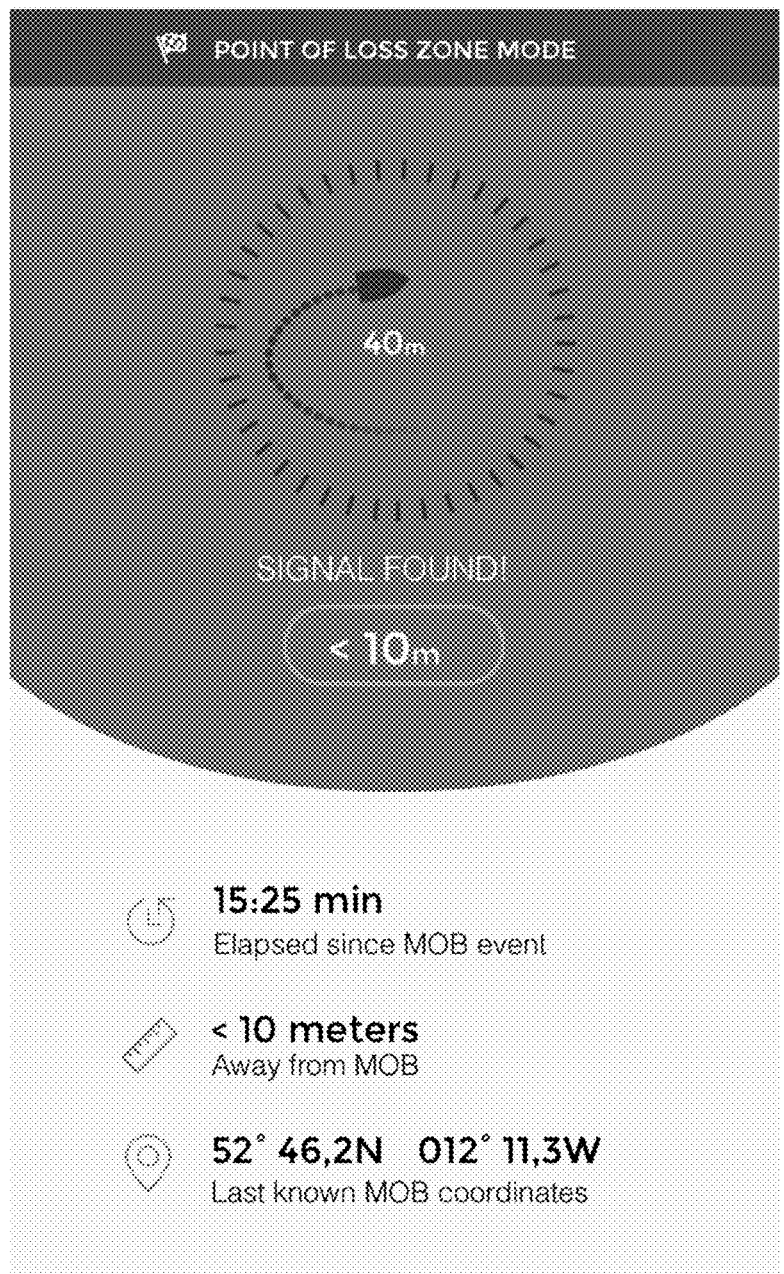
Figure 15:
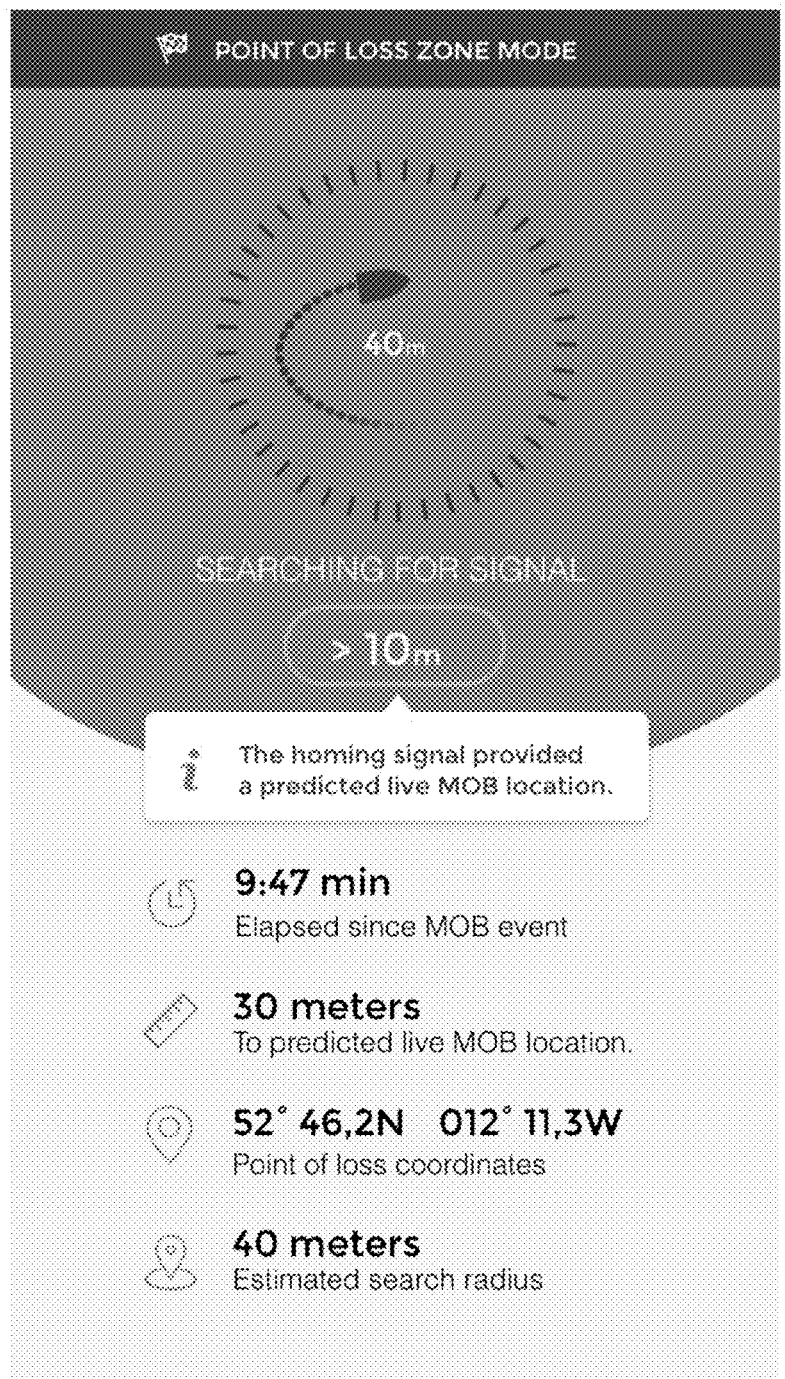
Figure 16:
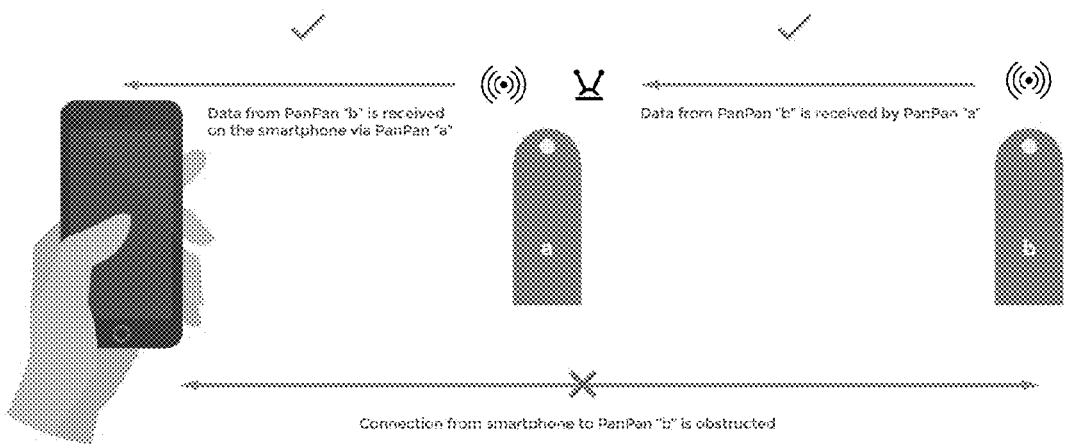
Figure 17:
Figure 18:
Figure 19:
Figure 20:
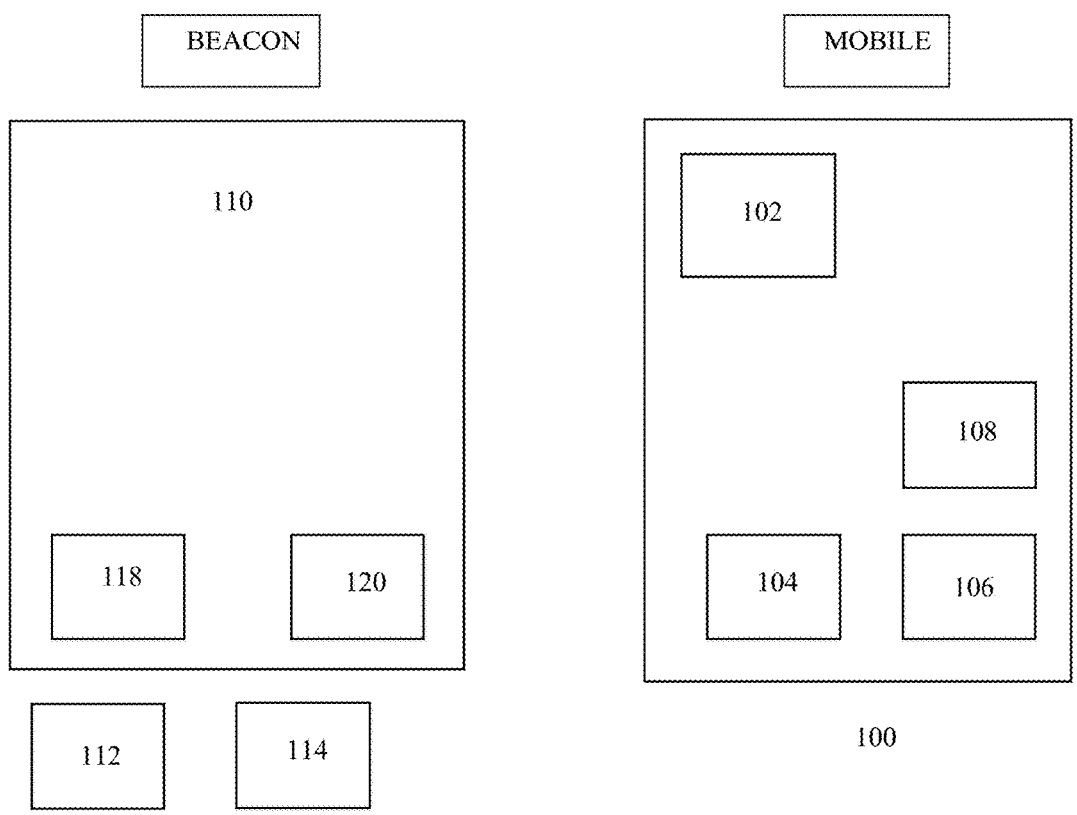
Figure 21:
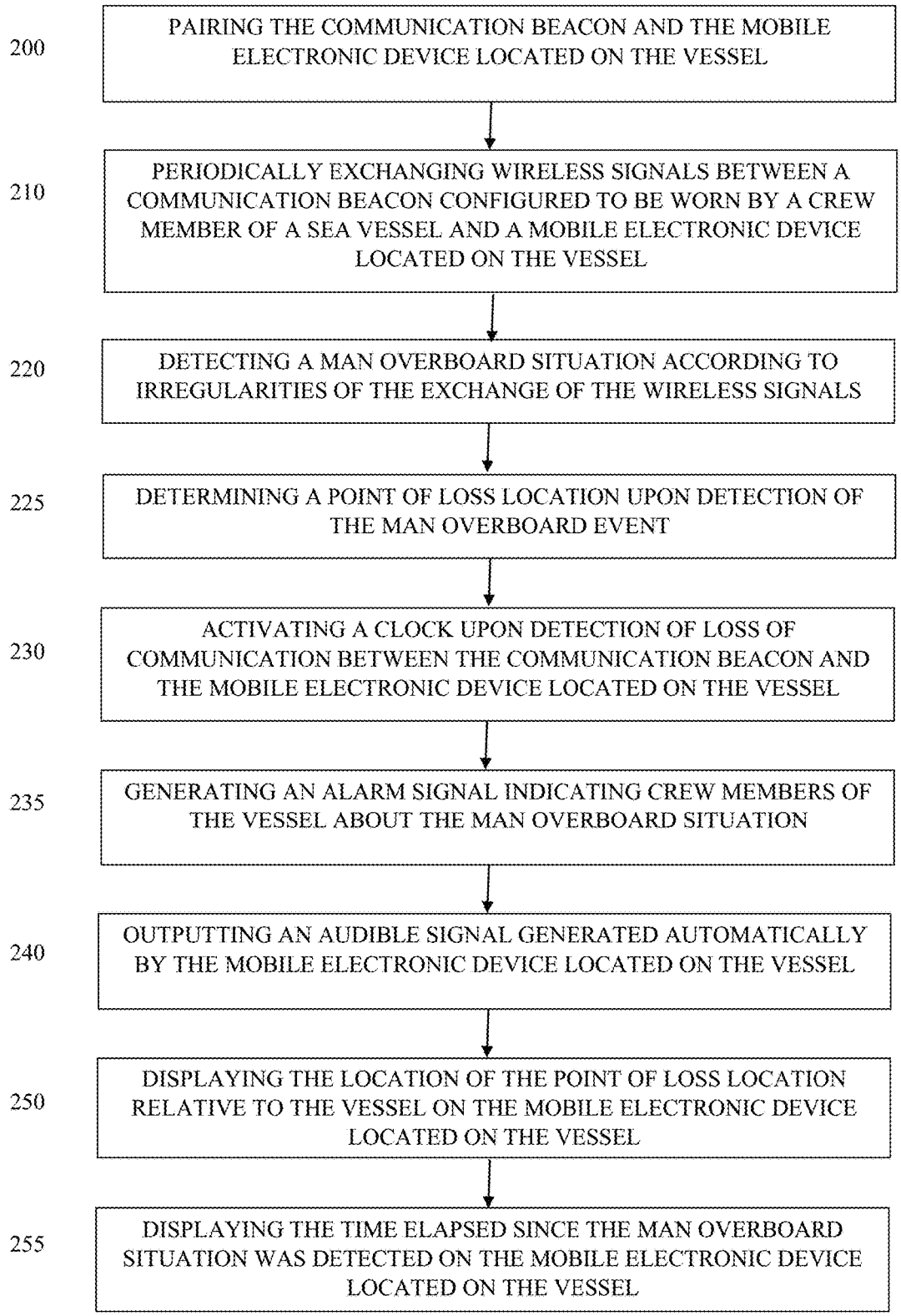
Figure 22:
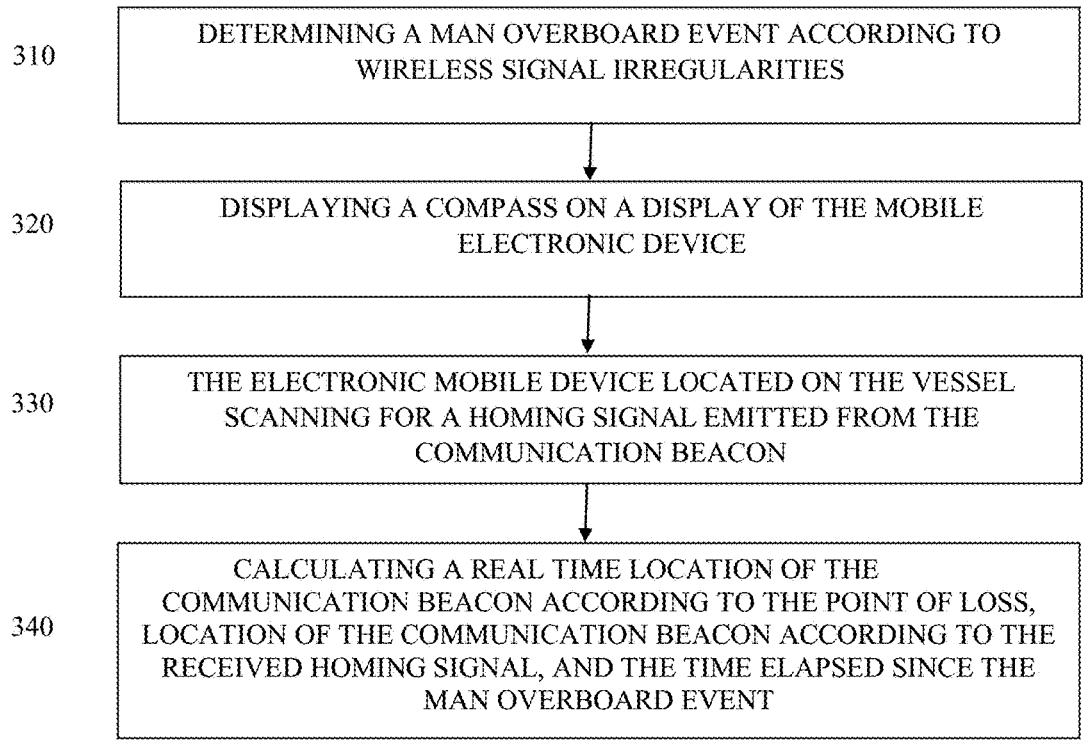

FIG. 12 shows a screenshot of a compass displayed on the mobile electronic device, according to exemplary embodiments of the invention;

FIG. 13 shows a screenshot of a display on the mobile electronic device upon the vessel reaching the point of loss, according to exemplary embodiments of the invention;

FIG. 14 shows a screenshot of a display on the mobile electronic device upon finding the beacon signal, according to exemplary embodiments of the invention;

FIG. 15 shows a screenshot of a display on the mobile electronic device upon calculating a real-time location from the homing signal, according to exemplary embodiments of the invention;

FIG. 16 schematically shows two beacons and a mobile electronic device using a technique of a mesh network, according to exemplary embodiments of the invention;

FIG. 17 shows the water sensor embedded in the housing of the beacon, according to exemplary embodiments of the subject matter;

FIGS. 18 and 19 show how the beacon can be attached to dog collars;

FIG. 20 shows a system for handling a man overboard event, according to exemplary embodiments of the subject matter;

FIG. 21 shows a method for handling a man overboard event, according to exemplary embodiments of the subject matter; and, FIG. 22 shows a method for calculating a beacon's location during a man overboard event, according to exemplary embodiments of the subject matter.

DETAILED DESCRIPTION OF THE INVENTION

The subject matter in the present invention discloses a system and method for detecting and handling a man overboard situation. The method comprises detecting a man overboard situation according to irregularities of exchange of wireless signals between a communication beacon worn on or held by the person who fell off the vessel and a mobile electronic device located on the vessel. The irregularities may include a wireless signal from a water sensor embedded into the communication beacon indicating that water is in contact with the sensor for longer than a predefined period of time. Another example of irregularity in the exchange of wireless signals is change in signal strength, loss of communication, and the like.

Definitions

Smart device: Smartphone, tablet or computer (laptop/desktop).

App: Software application running on a smart device.

Beacon: A ultra low power, waterproof and water sensor enabled Bluetooth beacon that transmits at the FFC power limit of 8 dBm.

Repeater: A dedicated, waterproof, Bluetooth, GPS and audio speaker enabled wireless data repeater. A beacon could also act as a repeater.

MOB: Man overboard

Vessel: A watercraft powered by either wind, a motor or humans.

Upon detection of the man overboard event, the mobile electronic device determines a point of loss location in which the person fell of the vessel. Then, an alarm signal is generated, indicating crew members of the vessel about the man overboard event; and the location of the point of loss location relative to the vessel is displayed on the mobile electronic device located on the vessel. The detection may result from a loss of signal, reduction of signal strength, other irregularities of the wireless signal, or according to transmission of a water sensor data embedded in the communication beacon. The transmission contains "wet values" from the water sensor.

The system of the invention comprises the mobile electronic device and the communication beacon paired with the mobile electronic device. The mobile electronic device may be a laptop computer having wireless transmission capabilities, a tablet computer, a beeper, a mobile telephone device or any other device comprising a display device, a processing module and a wireless receiver.

Figure 1:
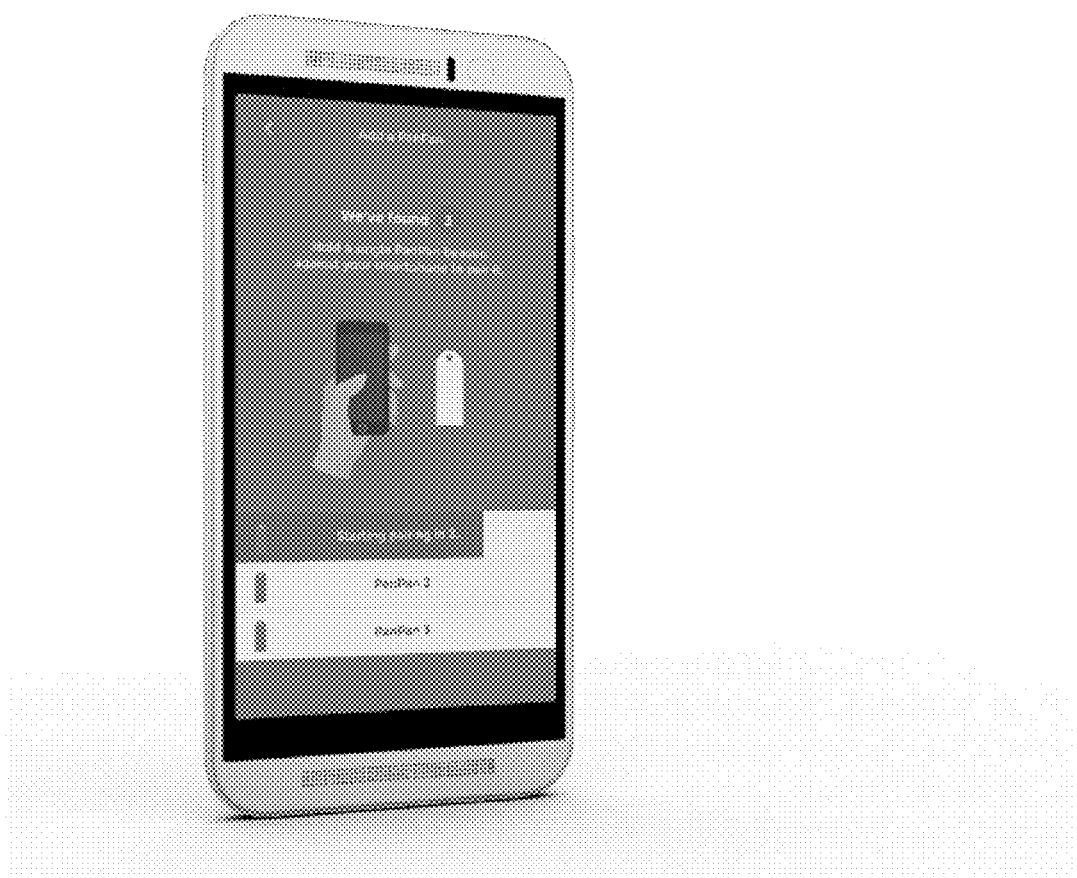

FIG. 1 shows a smartphone running a mobile application, according to exemplary embodiments of the disclosed subject matter. The smartphone is a device for the mobile electronic device located on the vessel and communicating with the communication beacon worn by the crew member of the vessel. The mobile electronic device located on the vessel may operate a dedicated software, hardware, or firmware for performing at least some of the steps disclosed in the subject matter.

The mobile electronic device comprises a display device for displaying at least some of the following: the location of the man overboard event, the current location of the communication beacon, location of the beacon when transmitting the last signal received at the mobile electronic device, time elapsed since the man overboard event, a compass and the like.

The mobile electronic device further comprises a wireless receiver for receiving the signals from the communication beacon and a processor for determining whether or not to generate an alarm signal according to irregularities in the wireless signals exchange with the beacon. The mobile electronic device may also comprise a memory for storing a set of rules according to which the method is performed. For example, the memory stores previous signals from the beacon, thus enabling the processor to determine irregularities. The memory may also comprise a software used to calculate the estimated location of the beacon, and thus of the person who fell off the vessel, as elaborated below.

Figure 2:

FIG. 2 shows a communication beacon using Bluetooth technology, according to exemplary embodiments of the disclosed subject matter. The beacon comprises a waterproof housing configured to house the electrical components therein. The electrical components comprise a wireless transmitter configured to transmit signals later received at the mobile electronic device on the vessel. The housing also covers a power source, such as a battery. The beacon also comprises a hanger configured to attach or secure the beacon to a wearable item worn by the crew member of the vessel. The hanger of FIG. 2 is the ring on the upper section of the housing. A belt or cord connected to the crew member's clothes may be inserted into the ring, thus securing the beacon to the crew member even when falling off the vessel.

Figure 3:
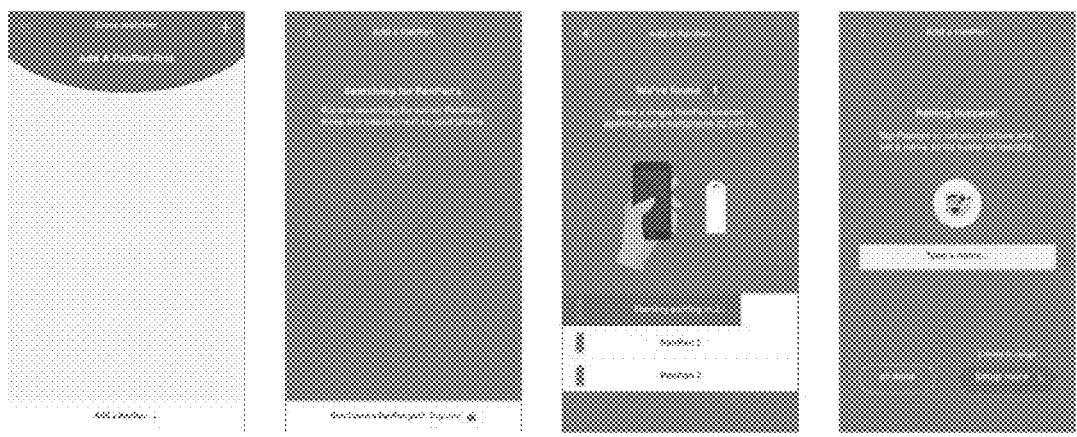

FIG. 3 shows screenshots of an installation and setup process of the beacon relative to a mobile electronic device located on the vessel, according to exemplary embodiments of the disclosed subject matter. The first phase is from the left, in which the user of the mobile electronic device inputs that he or she wishes to add a communication beacon to communicate with the mobile electronic device. Then, the mobile electronic device scans the network for beacons. While scanning, the mobile electronic device filters beacons that are already registered and devices which are not beacons with the same properties of those configured to communicate with the mobile electronic device. Then, after finding a beacon, the display of the mobile electronic device shows details of the beacon, for example ID of the beacon, beacon type, color, person associated with the beacon and the like. Then, the display shows that the pairing process has succeeded. After pairing the user can assign the beacon to a crew member by assigning a name and picture to the beacon on the mobile electronic device. In certain cases, by holding the beacon against the mobile electronic device, it will initiate the pairing process. This is done by using the signal strength which in turn is used to determine the beacons proximity to the mobile electronic device. In certain embodiments, Bluetooth or NFC technology can be used to pair the beacon to the mobile electronic device.

Figure 4:
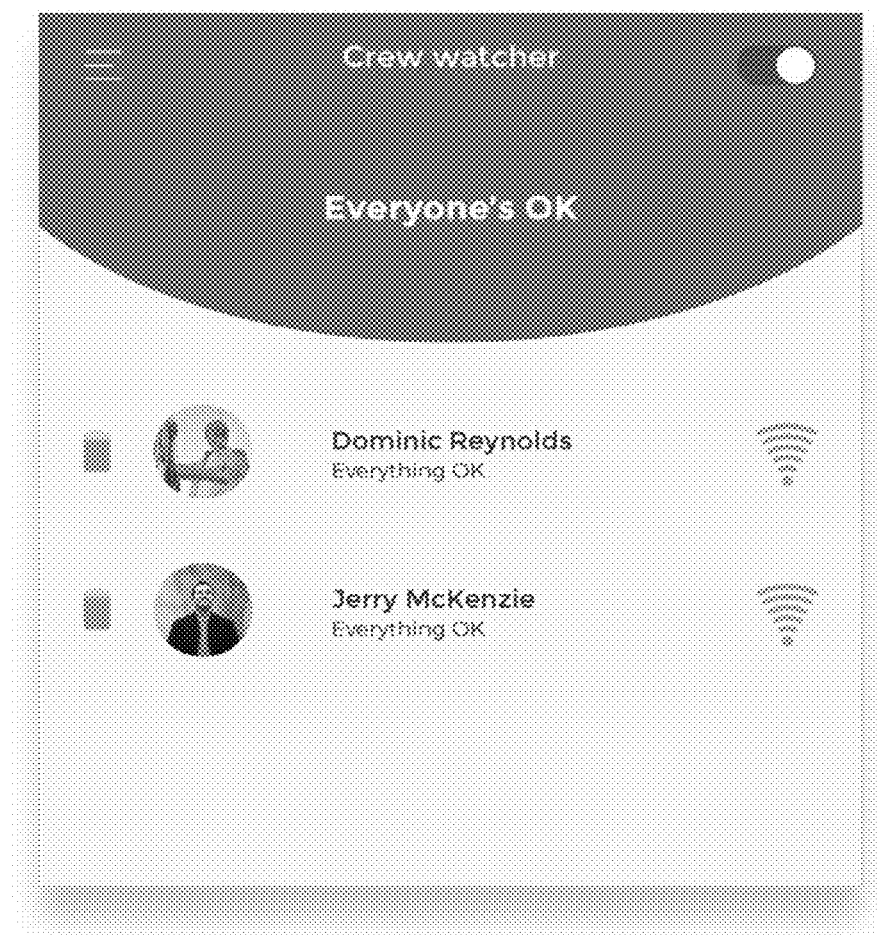

FIG. 4 shows a screenshot of a status feedback displayed on a mobile application running mobile electronic device located on the vessel, according to exemplary embodiments of the disclosed subject matter. The status feedback shows a list of persons associated with the beacons. When exchange of signals is regular, the feedback is positive, and displays an icon on the display of the mobile application running accordingly, for example the green icon right to the crew member's name.

In certain cases, mobile electronic device monitors the beacon's connection and the water sensor data. Every time a signal is received, the signal icon flashes. Signal strength, system status, and battery status are all shown in real time.

In certain cases, the system provides feedback at a glance. Feedback is provided at a glance trough strong use of color. The app uses a particular color coding system: Gray for in-active, Green for positive and Orange for "attention required."

Figure 5:
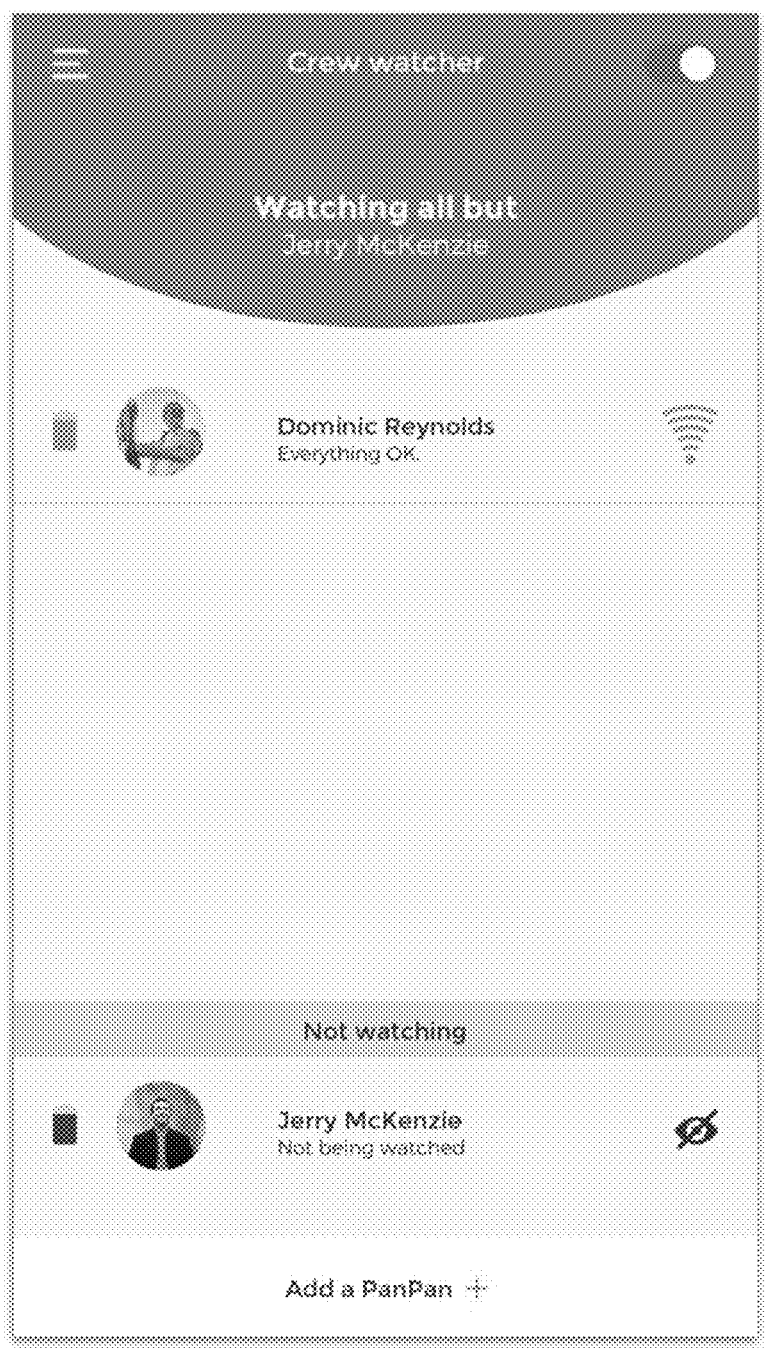

FIG. 5 shows a screenshot of a status feedback displayed on the mobile application with one beacon not responding, according to exemplary embodiments of the disclosed subject matter. The list of crew members having a positive status may be displayed separately from the crew members identified as man overboard or identified as beacon not responding. The latter two statuses may have another icon next to the crew member's name.

Figure 6:
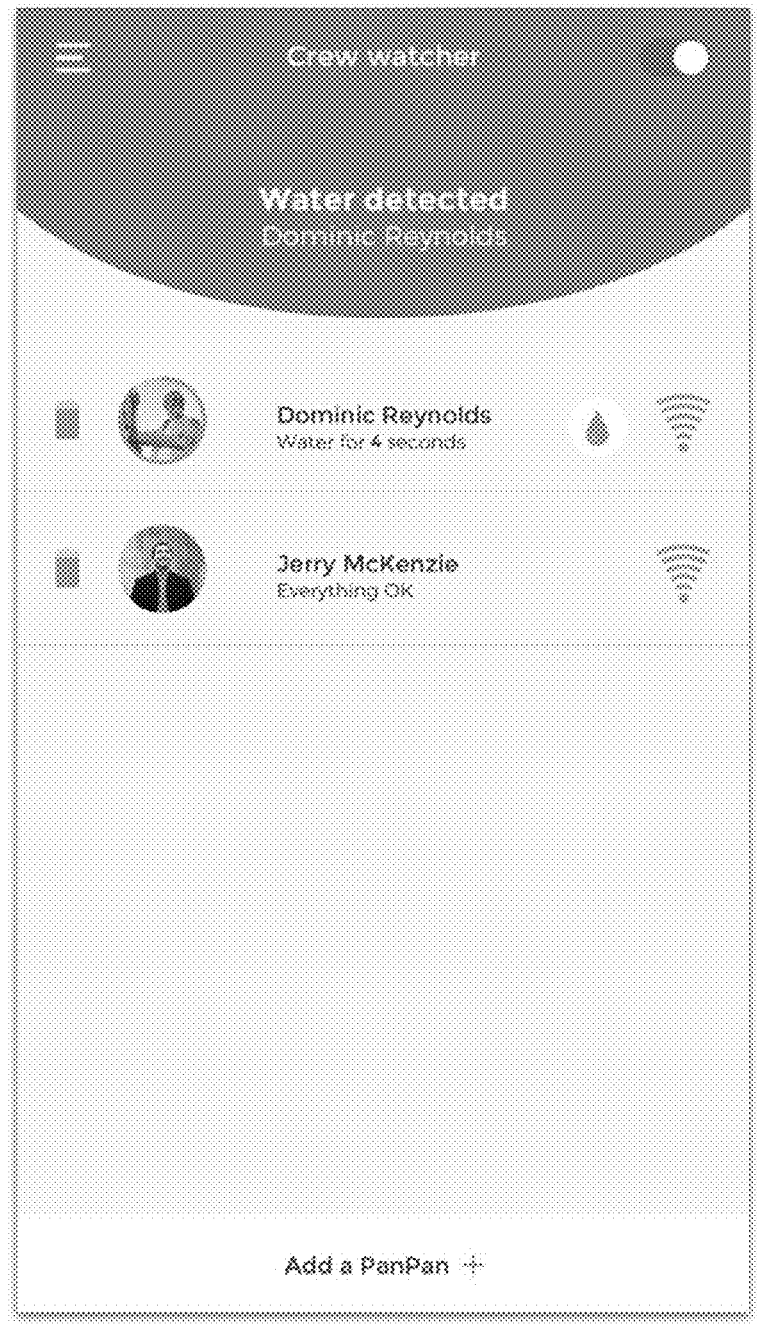

FIG. 6 shows a screenshot of a status feedback in which water is detected for a specific period of time, according to exemplary embodiments of the disclosed subject matter. The mobile electronic device receives a wireless signal generated by the water sensor embedded in the communication beacon. When no water is sensed, the sensor will send another signal indicating no water on the beacon. The alarm signal may be generated only a predefined period of time after receiving the water signal, to avoid a situation in which waves falling on the vessel wet the water sensor but there is no man overboard event. An appropriate icon may be displayed, to show the water signal is received, associated with a specific crew member.

Figure 7:
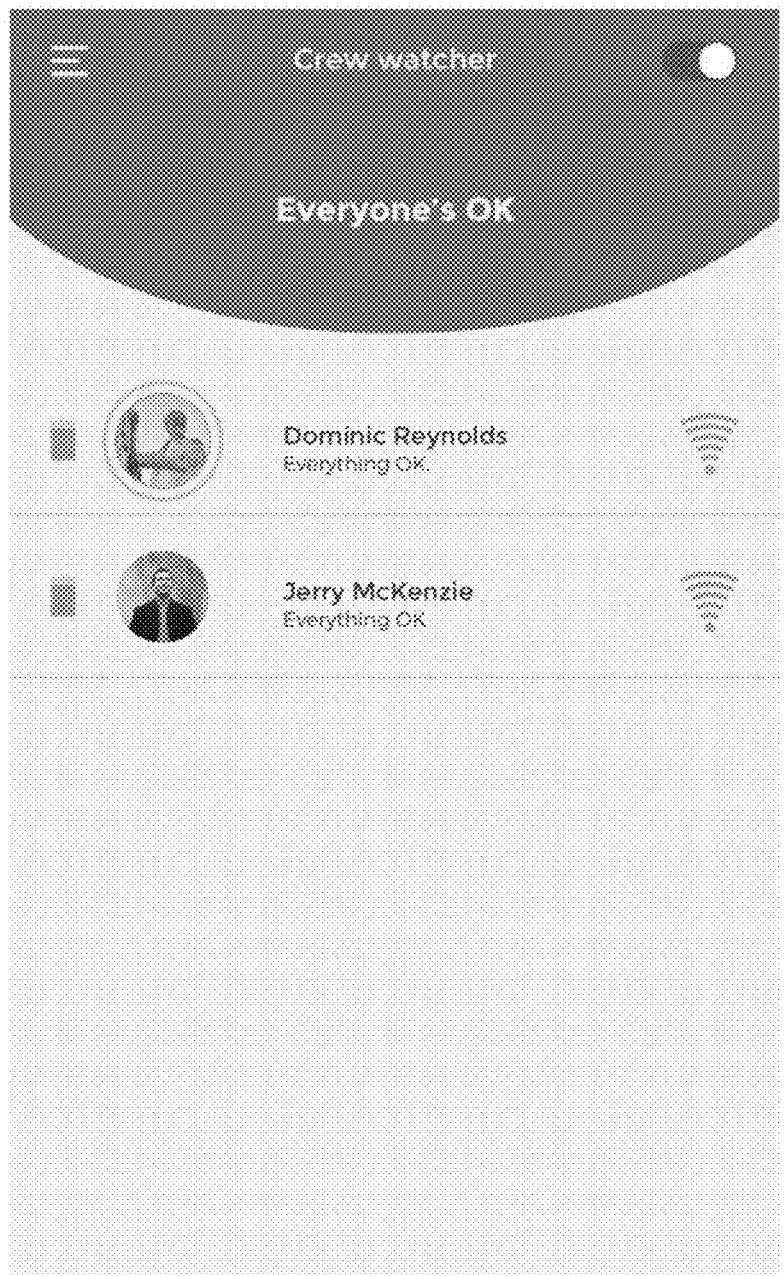

FIG. 7 shows a screenshot of a status feedback in which the beacon is identified as proximal to the mobile electronic device located on the vessel, according to exemplary embodiments of the disclosed subject matter. An appropriate icon may be displayed next to the crew member's name whose beacon is proximal.

Figure 8:
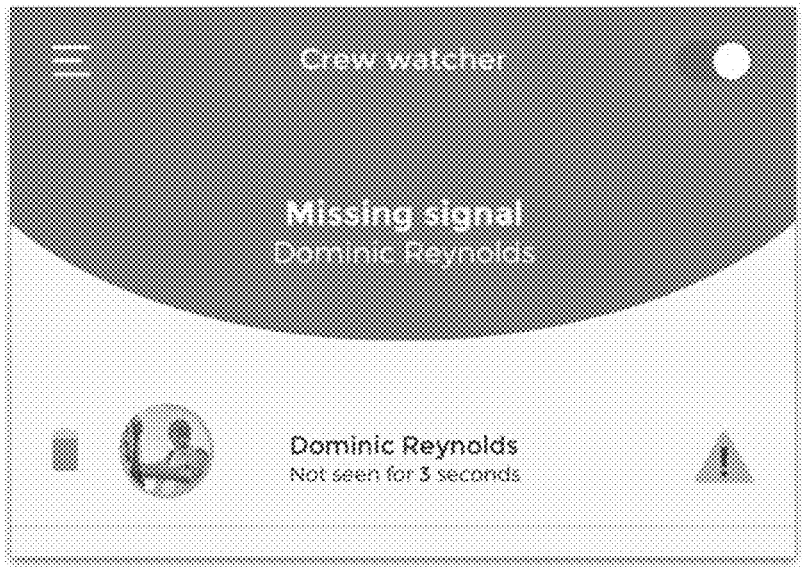

FIG. 8 shows a screenshot of a status feedback in which the beacon is identified as loss of signal, according to exemplary embodiments of the disclosed subject matter. The icon displayed next to the crew member's name may represent danger. A clock is automatically activated in case of loss of signal, and the alarm signal is generated only a predefined time after loss of signal, to avoid false positive. The mobile electronic device located on the vessel may display the time elapsed since loss of signal until signal exchange is back to normal.

Figure 9:
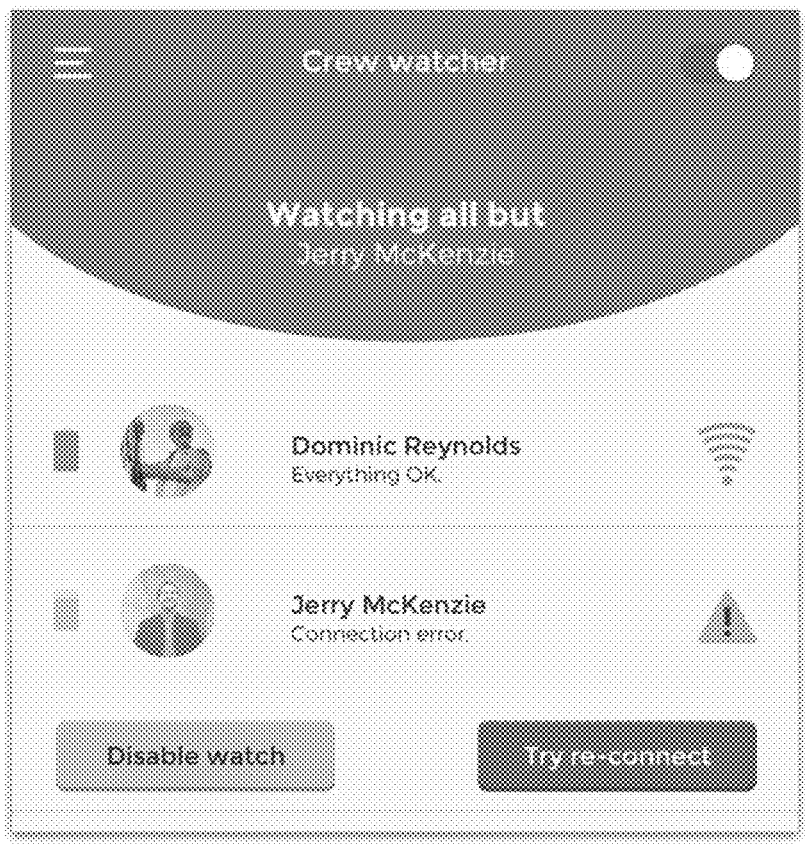

FIG. 9 shows a screenshot of a status feedback in case there is an error concerning the beacon, according to exemplary embodiments of the disclosed subject matter.

Figure 10:
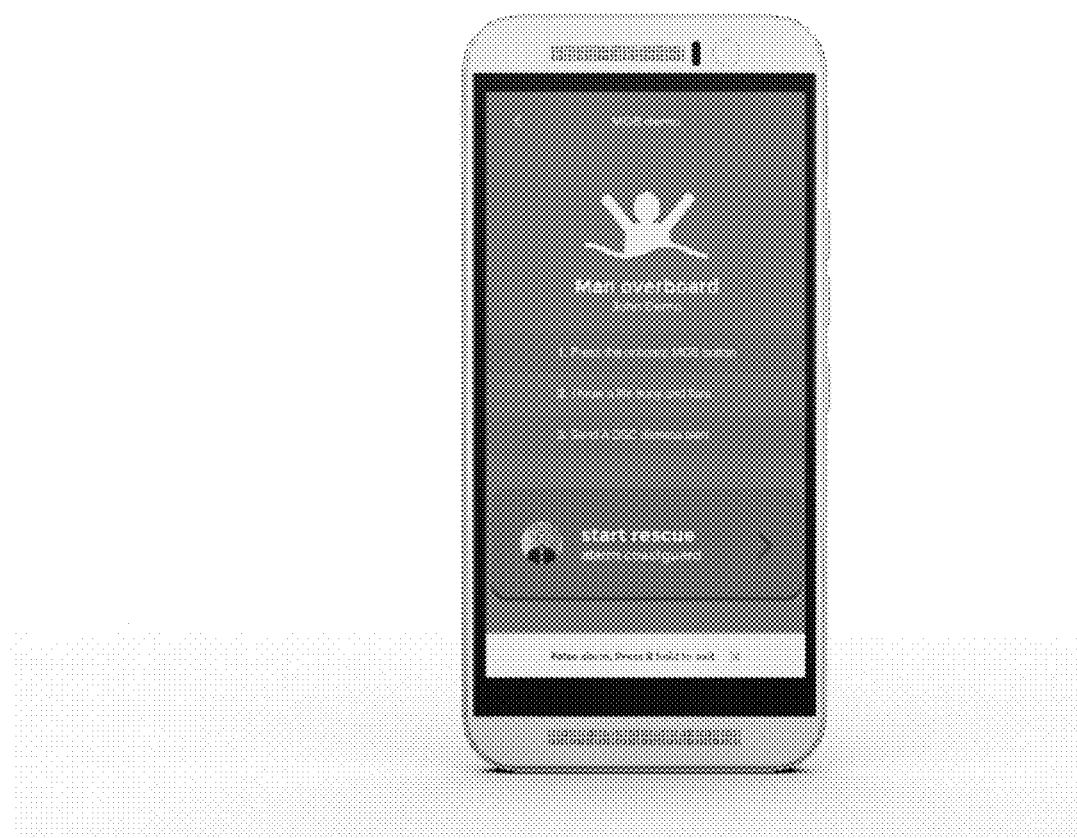

FIG. 10 shows a screenshot of a status feedback in case there is a man overboard event, according to exemplary embodiments of the disclosed subject matter.

In case the communication beacon registered at the mobile electronic device detects water or loses its signal, the mobile electronic device automatically generates an alarm signal. The alarm signal may be audible, visual and haptic on the mobile electronic device. The alarm signal may be generated after a predefined period of time after detection the signal irregularities, for example within three (3) seconds. The alarm signal may clearly state what happened, "Man overboard". In some cases, the volume of the alarm sound increases over time. In some cases, the alarm signal may comprise vibration of the mobile electronic device and flash its camera strobe light.

In some exemplary embodiments, textual instructions are displayed on the mobile electronic device upon determination of the man overboard event. In some cases, a signal may be sent to a third party, informing the man overboard event, name of the person who fell off the vessel, vessel's name and distance to point of loss, the event location and time. The third party may be a coast guard, known vessels in the vicinity and the like. In certain embodiments, the mobile electronic device automatically sends an alarm to the coast guard upon a MOB event.

Figure 11:
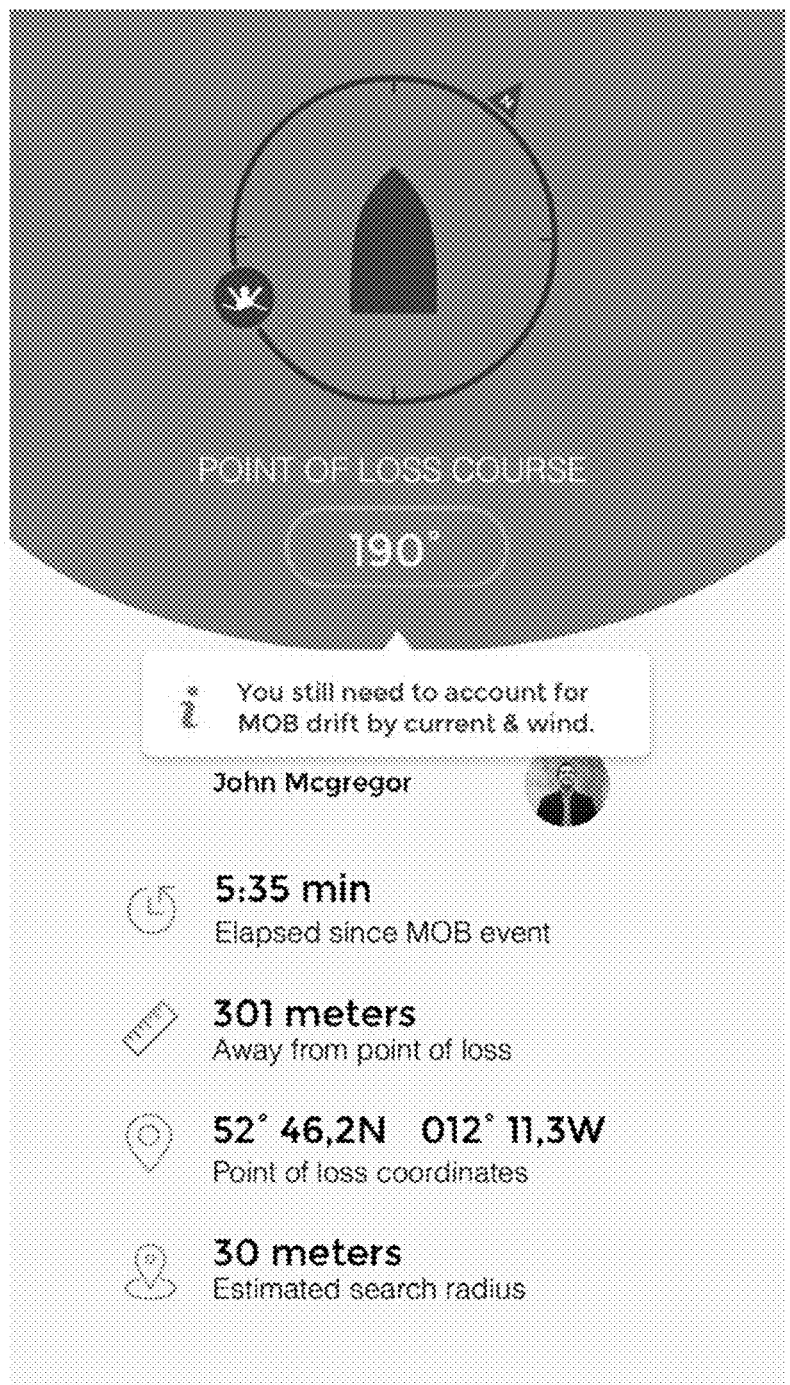

FIG. 11 shows a screenshot of a compass displayed on the mobile electronic device, according to exemplary embodiments of the invention. The compass directs the user of the mobile electronic device towards the point of loss. The compass shows the current direction of the vessel, the North, and the direction to the point of loss. In some cases, the compass is displayed according to calculations performed on a processing module of the mobile electronic device or calculations performed on a remote device, for example a server communicating with the mobile electronic device. In FIG. 11, the compass shows the user of the mobile electronic device that the vessel should turn left in order to reach the person who fell off the vessel, and the current heading is incorrect.

FIG. 12 shows a screenshot of a compass displayed on the mobile electronic device, according to exemplary embodiments of the invention. Unlike FIG. 11, FIG. 12 shows that the current heading is correct. An appropriate icon may be displayed, for example a different icon in case the heading is correct or the heading is incorrect.

FIG. 13 shows a screenshot of a display on the mobile electronic device upon the vessel reaching the point of loss, according to exemplary embodiments of the invention. The mobile electronic device displays the vessel's location within an estimated search radius along with the track already covered by the vessel within that radius.

FIG. 14 shows a screenshot of a display on the mobile electronic device upon finding the beacon signal, according to exemplary embodiments of the invention. The wireless receiver of the mobile electronic device periodically scans for a homing signal from the beacon. In some cases, a plurality of beacons transmit simultaneously to the same mobile electronic device. The homing signal may be emitted at a pre-defined interval such as every 300 milliseconds (ms) at maximum power (8 dBm). Once the signal is found, a green color code may be displayed along with an appropriate text. Additionally, an audio sound may be displayed such as an audio indicating "signal found, MOB within 10 meters."

FIG. 15 shows a screenshot of a display on the mobile electronic device upon calculating a real-time location from the homing signal, according to exemplary embodiments of the invention. The display shows the time elapsed since the determination of the man overboard event, the distance to the predicted current location of the beacon as calculated using the homing signal, coordinates of the point of loss and the search radius. The display shows that the homing signal provides a predictive live MOB location.

FIG. 16 schematically shows two beacons and a mobile electronic device using a technique of a mesh network, according to exemplary embodiments of the invention.

The mesh enables data to be repeated by any beacon or smartphone in the network. A wireless connection may be lost due to distance or obstacles between sender and receiver (beacon and smart device). Allowing the connection to travel via alternate paths extends the effective range of a Bluetooth device of the beacon and generates redundancy. If a smartphone crashes or runs out of power, another tablet or smartphone automatically takes over. The Bluetooth protocol defines a maximum of 7 slave devices (beacons) per master (smartphone). However, using the mesh this limit can be bypassed by having multiple masters and slaves effectively communicating with each other.

The method of utilizing mesh during a man overboard event comprises detecting at the communication beacon that its connection to the mobile electronic device reduces. Then, the beacon begins transmitting data collected by the water sensor to any device that listens. The data from the water sensor can be received by any Bluetooth 4 or up device.

Simultaneously, the mobile electronic device, for example the smartphone, also detects the reduction in the signal from the specific beacon and sends a command to all devices (beacons and other mobile electronic devices) registered in the network to search for the particular beacon with the poor connection.

Upon receipt of the water sensor signal by any device in the network, the finding device repeats the data from the beacon with poor connection to the main smart device, providing a seamless hand-over before the connection actually lost. The method disclosed above is likely to be performed just before a potential disconnect, thus reducing latency or loss of data which equals no false alarm.

FIG. 17 shows the water sensor embedded in the housing of the beacon, according to exemplary embodiments of the subject matter.

The water sensor may comprise two conductive pins. When idle both pins are "off" and no electrical currents is transferred through them, to prevent unwanted discharge and electrolysis in moist conditions. When the crew watcher is registered in the mobile electronic device, a voltage is applied to one pin and voltage is continuously measured at the other pin. If a conductive substance (such as water) "connects" the two pins, a voltage can be read at the ground pin, indicating that water has been detected.

If the beacon senses water longer than a certain interval, such as 10 seconds, the sensor automatically cuts power to its sensing pins and check wetness every 10 seconds until it no longer registers a voltage at ground indicating that the beacon is dry. The pins may be placed underneath the bottom surface on the underside of the beacon to prevent unwanted connection by water tension when out of the water, avoid damage by bumps and crashes and prevent false alarms by rain or waves.

FIGS. 18 and 19 show how the beacon can be attached to pet collars, such as dog collars. The pet collar attachment consists of an elastic band that loops around both the beacon and the pet collar. An additional tether can be connected to the universal mounting hole for redundancy.

FIG. 20 shows a system for handling a man overboard event, according to exemplary embodiments of the subject matter. The system comprises a mobile electronic device 100, for example a laptop, smartphone, tablet and the like, located on the vessel. The mobile electronic device 100 communicates with one or more communication beacons 110, 112, 114 already registered at the mobile electronic device 100. The one or more communication beacons 110, 112, 114 periodically exchange wireless signals with the mobile electronic device 100, for example via Bluetooth protocol. The mobile electronic device 100 comprises a display device 102 configured to display status reports of the communication beacons. The display device 102 receives data from a processing module 104 of the mobile electronic device 100. The processing module 104 is configured to determine a man overboard event according to irregularities of signals received by the wireless receiver 106 of the mobile electronic device 100. For example, in case the wireless receiver 106 receives a signal from a water sensor 118 embedded in communication beacon 110 for over 5 seconds, the processing module 104 may determine a man overboard event. The communication beacons may also comprise a housing for securing the electrical circuitry and a wireless transmitter 120 configured to send wireless signals to the mobile electronic device 100. The mobile electronic device 100 may also comprise a memory module 108 for storing prior signals received from the communication beacons 110, 112, 114. Thus, the processing module 104 may compare a signal received by the wireless receiver 106 with signals stored in the memory module 108. The mobile electronic device 100 may also comprise a speaker for outputting an audible alarm in the vicinity of the mobile electronic device 100.

FIG. 21 shows a method for handling a man overboard event, according to exemplary embodiments of the subject matter. Step 200 discloses pairing the communication beacon and the mobile electronic device located on the vessel. Step 210 discloses periodically exchanging wireless signals between a communication beacon configured to be worn by a crew member of a vessel and a mobile electronic device located on the vessel. Step 220 discloses detecting a man overboard situation according to irregularities of the exchange of the wireless signals. The irregularities may be, for example, a signal from a water sensor embedded in the beacon, significant decrease in signal strength from the beacon or loss of communication from the beacon. Step 225 discloses determining a point of loss location upon detection of the man overboard event. The point of loss may be determined according to the last signal received from the beacon.

Step 230 discloses activating a clock upon detection of loss of communication between the communication beacon and the mobile electronic device located on the vessel. The clock may be used to prevent false alarms, as the alarm may be generated only after a predefined number of seconds upon detection of loss of communication. Step 235 discloses generating an alarm signal indicating crew members of the vessel about the man overboard situation. Step 240 discloses outputting an audible signal generated automatically by the mobile electronic device located on the vessel. Step 250 discloses displaying the location of the point of loss location relative to the vessel on the mobile electronic device located on the vessel. Step 255 discloses displaying the time elapsed since the man overboard situation was detected on the mobile electronic device located on the vessel.

FIG. 22 shows a method for calculating a beacon's location during a man overboard event, according to exemplary embodiments of the subject matter. Step 310 discloses determining a man overboard event according to wireless signal irregularities. Step 320 discloses displaying a compass on a display of the mobile electronic device; said compass shows the direction between the electronic mobile device located on the vessel to the point of loss. Step 330 discloses the electronic mobile device located on the vessel scanning for a homing signal emitted from the communication beacon. Step 340 discloses calculating a real-time location of the communication beacon according to the point of loss, location of the communication beacon according to the received homing signal, and the time elapsed since the man overboard event.

In certain embodiments of the invention, the mobile electronic device monitors the beacon's connection and the water sensor data. Every time a signal is received the signal icon flashes. Signal strength, system status and battery status are all shown in real time.

In certain embodiments of the invention, the a countdown is initiated upon first detection of signal loss or water. The countdown runs up to a configurable threshold. The threshold is there to prevent false alarms that might be created by splashing waves, rain or in the case of signal; an obstacle between sender and receiver.

In certain embodiments of the invention, the method and system includes detecting beacon proximity using signal strength (RSSI).

In certain embodiments of the invention, the method and system includes the mobile electronic device vibrating and flashing its camera strobe light upon a MOB event.

In certain embodiments of the invention, the method and system includes configuring an automated or automatic text message to an emergency contact.

In certain embodiments of the invention, the method and system includes using the GPS coordinates of the MOB and the coordinates of the mobile electronic device, a heading between the two is calculated. This heading is then translated visually to the MOB compass, showing a "MOB icon" relative to the position of the vessel boat, no matter how the vessel is oriented or the mobile electronic device. Since GPS is never 100% accurate, the MOB compass is only updated when the traveled distance is between two points becomes greater than the GPS accuracy estimation returned by the smart device.

The objective for the captain of the vessel is to simply steer the boat so that the MOB icon will in front of the boat. If he/she succeeds the Icon will turn green and increase in size.

Once the MOB compass brought the user back to the point of loss, the mobile electronic device will show the position of the vessel within the estimated search radius along with the track the vessel travelled within that radius.

The radius grows over time as current or wind likely has taken the MOB from its original point of entry in the water. Simultaneously the mobile electronic device scans for the beacons homing signal which is emitted every 300 milliseconds (ms) at maximum power (8 dBm). Once the signal is found, the green color code promptly shows in the header assisted by the text: "Signal found"

A real-time position is automatically calculated by comparing the original point of loss and the newly retrieved location by the homing signal. The two location points along with the elapsed time can be used to calculate the heading of the MOBs drift along with the drift speed. This data is then extrapolated over time to provide a real-time location to the user.

Due to the interference of the beacon's signal by the water the app on the mobile electronic device is also able estimate the MOBs proximity to be less than 10 meters.

In certain embodiments of the invention, the method and system includes setting up a beacon for property mode to monitor expensive equipment such as a dinghy instead of a person. If the property moves out of range a custom theft/loss alarm will sound. Property mode will disable the water sensor and allow for more slack in the connection. Moreover, the system may be placed in a bilge to detect water and act as a bilge alarm.

In certain embodiments, the beacon includes a water sensor consists of two Phosphor Bronze, gold plated, conductive pins. The material of the pins is chosen for its excellent resistance to saltwater corrosion. When idle both pins are "off" meaning, no electrical currents run through them. This prevents unwanted discharge and electrolysis in moist conditions.) When the crew watcher is turned on in the app, a voltage is applied to one pin and voltage is continuously measured at the other ground pin. If a conductive substance (such as water) "connects" the two a voltage can be read at the ground pin, indicating that water has been detected. If the beacon senses water longer than 10 seconds it will automatically cut power to its sensing pins and instead check if it's still wet every 10 minutes until it no longer registers a voltage at ground indicating that the beacon is now dry. This is again to prevent rapid, unwanted discharge due to the poor conductivity properties of water and electrolysis damaging the sensing pins. The pins lay underneath the bottom surface on the underside of the beacon to: (1) Prevent a unwanted connection by water tension when out of the water; (2) Avoid damage by bumps and crashes; and (3) Prevent false alarms by rain or waves.

Aside from the water sensor the beacon features a universal mounting hole that allow the beacon to be attached to anything, a life jacket, a buckle belt, a dinghy or even a dog. The dog collar attachment consists of an elastic band that loops around both the beacon and the dog collar. An additional tether can be connected to the universal mounting hole for redundancy.

In certain embodiments, the mobile electronic device includes full audio rescue guidance. In this manner, a user will not have to look at their mobile electronic device during rescue of the man overboard.

In certain embodiments, the mobile electronic device includes "press and hold" buttons in the mobile electronic device and mobile application that require a user to hold a button as the bar fills to close rescue guidance in an effort to prevent accidental closes.

In certain embodiments, the mobile electronic device and mobile application allows for monitoring multiple crew members simultaneously.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A method of communicating a man overboard situation, the method comprising:
   periodically exchanging wireless signals between a communication beacon configured to be worn by a crew member of a vessel and at least one mobile electronic device located on the vessel, the at least one mobile electronic device being portable, wherein the at least one mobile device forms a local network on the vessel;
detecting a man overboard situation according to irregularities of the exchange of the wireless signals between the communication beacon at the at least one mobile electronic device;
determining a point of loss location upon detection of the man overboard event;
generating an alarm signal indicating crew members of the vessel about the man overboard situation on the local network on the vessel; and
graphicly and textually displaying the location of the point of loss location relative to the vessel on the at least one mobile electronic device located on the vessel.

2. The method of claim 1, wherein detecting the man overboard situation is detected via a water sensor integrated into the communication beacon.

3. The method of claim 1, further comprising detecting the man overboard situation by the at least one mobile electronic device located on the vessel according to signal properties.

4. The method of claim 1, further comprises displaying the time elapsed since the man overboard situation was detected on the at least one mobile electronic device located on the vessel.

5. The method of claim 1, further comprises displaying a distance between a current location of the naval vessel and the point of loss location.

6. The method of claim 1, further comprises automatically pairing the communication beacon and the at least one mobile electronic device located on the vessel by placing the communication beacon close to the at least one mobile electronic device located on the vessel and enabling exchange of wireless signals using Bluetooth communication.

7. The method of claim 1, further comprises generating an audible signal outputted automatically from the at least one mobile electronic device located on the vessel upon detection of the man overboard situation.

8. The method of claim 1, further comprises activating a clock upon detection of loss of communication between the communication beacon and the at least one mobile electronic device located on the vessel and generating the alarm signal in response to the loss of communication being measured on a time longer than a predefined threshold.

9. The method of claim 1, further comprises displaying the alarm on a foreground of the at least one mobile electronic device located on the vessel upon detection of the man overboard situation.

10. The method of claim 1, further comprises displaying textual instructions on the at least one mobile electronic device upon detection of the man overboard situation.

11. The method of claim 1, further comprises displaying a compass on a display of the at least one mobile electronic device; said compass shows the direction between the electronic mobile device to the point of loss.

12. The method of claim 1, further comprises displaying a compass on the at least one mobile electronic device located on the vessel upon detection of the man overboard situation, said compass displays the direction and distance to the point of loss.

13. The method of claim 1, wherein transmitting the alarm signal from the communication beacon to the at least one mobile electronic device located on the vessel uses mesh technology, Bluetooth Technology, and/or Wi-Fi.

14. The method of claim 1, wherein the step of periodically exchanging wireless signals occurs on a continuous basis and an irregularity in the exchange of the wireless signals triggers a man overboard event.

15. A system for handling a man overboard situation on a vessel, comprising:
a communication beacon comprising a wireless transceiver configured to send and receive wireless signals, said communication beacon configured to be worn by a user; and
at least one mobile electronic device configured to be located on the vessel, said at least one mobile electronic device comprising a wireless transmitter configured to exchange the wireless signals with the communication beacon, the at least one mobile electronic device forming a local network on the vessel, wherein an irregularity in the exchange of wireless signals indicates a man overboard situation, wherein the at least one mobile electronic device is portable,
wherein upon the occurrence of the man overboard situation,
the at least one mobile electronic device determines the point of loss location,
the at least one mobile electronic device generates an alarm signal indicating crew members of the vessel about the man overboard situation on the local network on the vessel, and
the at least one mobile electronic device graphicly and textually displays the location of the point of loss location relative to the vessel on the at least one mobile electronic device.

16. The system of claim 15, wherein the alarm signal comprises at least one of sound, visuals, strobe light and vibrations.

17. The system of claim 15, further comprises displaying at least one of location coordinates, heading/direction, magnetic north, time since event, distance to point of loss, estimated search radius size.

18. The system of claim 15, wherein the communication beacon further comprising a transmitter configured to transmit an alarm signal to a recipient electronic mobile device of other crew members, indicating the recipient crew members of the man overboard situation.

19. The system of claim 15, wherein the at least one mobile electronic device further comprises displaying a compass on a display of the at least one mobile electronic device; said compass shows the direction between the electronic mobile device located on the vessel to the point of loss.

20. The system of claim 15, wherein a recipient electronic mobile device comprising a wireless receiver configured to receive an alarm signal from the communication beacon and to display the point of loss location relative to the vessel on the recipient electronic mobile device.

21. The system of claim 15, wherein the communication beacon includes a water sensor configured to detect when the communication beacon is in water and a wireless transmitter configured to transmit an alarm signal.

22. The system of claim 15, wherein the electronic mobile device located on the vessel scans for a homing signal emitted from the communication beacon.

23. The system of claim 15, wherein the electronic mobile device located on the vessel displays the vessels real-time location within an estimated search radius and a track of the vessel covered within that radius.

24. The system of claim 22, further comprises calculating a real-time location of the communication beacon according to the point of loss, location of the communication beacon according to the received homing signal, and the time elapsed since the man overboard event.

25. The method of claim 1, wherein exchange of wireless signals operates independently of a cellular signal.

26. The method of claim 1, wherein the at least one mobile device is capable of wirelessly integrating with onboard systems.

27. The method of claim 1, wherein the local network is a mesh network.

28. The method of claim 1, further comprising providing spoken navigational instructions during the man overboard situation.

29. The method of claim 1, wherein the at least one mobile electronic device uses GPS or uses GPS integrated into onboard systems linked to the local network.

30. A non-transitory computer readable storage medium storing a computer program product for handling a man overboard situation on a vessel, the non-transitory computer readable storage medium comprising:

computer executable instructions and data, the computer executable instructions able to execute a computer program able to:
  interact with a communication beacon, said communication beacon configured to be worn by a user;
  form a local wireless network on board the vessel,
  exchange wireless signals with the communication beacon, wherein an irregularity in the exchange of wireless signals indicates a man overboard situation,
  determine a point of loss location upon detection of the man overboard event;
  generate an alarm signal indicating crew members of the vessel about the man overboard situation; and
  graphicly and textually display the location of the point of loss location relative to the vessel on at least one mobile electronic device located on the vessel.

* * * * *